Patented Dec. 31, 1946

2,413,472

UNITED STATES PATENT OFFICE 2,413,472

ACCELERATED MOISTURE CONDITIONING AND MILLING OF GRAIN

Elizabeth J. Sullivan, Minneapolis, Minn., assignor to Russell-Miller Milling Co., Minneapolis, Minn., a corporation of Delaware No Drawing. Application May 27, 1946, Serial No. 672,715

13 Claims. (Cl. 241—8)

This invention relates to an improved method of conditioning grain, particularly wheat, for milling.

In milling processes in use at the present time for milling wheat and, to some extent also other grains, the grains are sent through a series of rollers known as "breaks" with intermediate sifting or "scalping" of certain products and by-products. In all, a period of about an hour may elapse between the time the grain enters the milling process and the time it emerges as a finished product such as flour, and during this period the particles of grain are exposed to large quantities of air that are used for separating out selected fractions of the products. Being very hygroscopic, grain tends to take on or give up moisture to the air during milling, depending upon whether the air is more moist or less moist than the parts of the grain undergoing milling.

For optimum milling conditions, the moisture of the wheat or other grain must be most accurately controlled and it is desired that the flour produced have 13.5–14.5% moisture. With the moisture content of the end product and for best milling conditions thus fixed, it has been a distinct problem to regulate the moisture content of the incoming wheat so that after picking up or losing moisture (depending upon the weather) the end product would have the desired moisture content.

Thus the moisture added to the incoming wheat stream has been determined by the amount of moisture in it to begin with, the final moisture desired and the highly variable factor due to loss or pickup of moisture during milling, and this latter variable factor has in turn depended upon what the "weather" would be like some hours after the moisture was added to a given lot of wheat.

Superimposed upon these variables is another factor, namely "tempering time," which has complicated the others. Moisture added to wheat will not enter the wheat berry readily until after about 8 hours, and this is likewise true of other grains. In short, nature has made grains resistant to an occasional wetting that they may thus survive showers, but when the wetting is prolonged, the moisture then penetrates. Wheats vary considerably in the tempering time required depending upon the class of wheat, variety, damage and weather conditions during the growing period.

To the miller, this has meant that moisture added to wheat or other grains has little effectiveness until the grain is permitted to "temper" for a period of hours—usually 8 to 48 hours depending upon the type of wheat. Thus, dry hard spring wheat usually requires a tempering time of 12 hours after the moisture is added, in order to obtain even a reasonably satisfactory moisture distribution, a condition which, if lacking, effects the mellowness and ease of milling of the grain. A period of tempering being essential, it has been necessary to provide bin capacities aggregating several days milling capacity. This has added to the expense and inconvenience of milling.

The length of time of "tempering" has a further distinct disadvantage. It has been shown heretofore that the amount of moisture added to the grain is determined in part by the humidity conditions during milling, and since milling has to be postponed for from 8 to 48 hours during tempering of the wheat, the miller frequently found that the weather had changed during the "tempering" period and that the amount of water which had been added was not the proper amount for milling under the changed weather conditions. In short, the milling has always been 8 to 48 hours behind the weather changes.

Heretofore, the only attempt at avoidance of these difficulties in regular tempering has been by last-minute drying or wetting of the grain before it enters the mill, but these makeshift expedients have not been effective to vary the moisture within the berry and, in all, are of little utility. Use has also been made of steam and vacuum as a means of shortening the tempering process but these require heavy and expensive machinery.

I have discovered an improved method of conditioning and tempering wheat and other grains wherein the application of moisture may be performed with complete accuracy and satisfaction only a few hours prior to milling and wherein the moisture distribution and penetration is accomplished with the utmost uniformity.

It is accordingly an object of the invention to provide a new method of conditioning and tempering grains for milling and more particularly to provide such improvements in the milling of wheat.

In carrying out my invention moisture is added to grain in the usual way, but in this instance an edible surface tension depressant, sometimes called "wetting agent," is added to the water used for moistening the grain. The wetting agent must be non-toxic in the amounts employed, it must have no undesirable taste or odor, and preferably should leave no apparent taste or odor, and should be sufficiently low in cost (or have sufficient effectiveness) so as not appreciably to increase the milling costs. Any wetting agent having these attributes is satisfactory. These attributes are fulfilled by sodium salt of the dioctyl ester of sulfonated succinic acid. This material is also known as the dioctyl ester of sodium sulfosuccinate, and has the trade name "Aerosol OT." Among other exemplary wetting agents which may be used satisfactorily in the process of the present invention there may be mentioned "Triton NE" (an organic polyether alcohol) manufactured by the Rohm and Haas Company; "Duponal D" (a fatty alcohol sulfate) made by the E. I. du Pont de Nemours & Company; "Nacconal E" (a sodium alkyl aryl sulfonate) manufactured by National Aniline & Chemical Co.; "Aresket" (monobutyl diphenyl sodium monosulfonate) made by Monsanto Chemical Company; and "Pemeko" (a sulfated alcohol) manufactured by Proctor & Gamble Company. Wetting agents such as pine oil are undesirable because of leaving a distinct odor and flavor in the finished flour which renders the latter useless as a foodstuff.

The point of application of the water containing the wetting agent to the wheat or other grains depends upon the milling practice in vogue in the particular mill wherein the present invention is applied. Thus, the application may be made in the form of a spray or by dripping a solution on the wheat while moving in a conveyor or, where the wheat is washed prior to milling, the application of wetting agent may be as a part of the washing treatment. Or as a further method the wetting agent solution may be applied as the rewetting water in mills wherein washing is followed by drying and then rewetting. Mechanical treatment is, however, unnecessary in order to obtain adequate moisture penetration.

The wetting agent is used in a concentration sufficient to reduce the surface tension of the resultant aqueous solution to 50 dynes per centimeter or less. Thus, when the water solution of wetting agent used for moistening the grain contains, for example, the dioctyl ester of sodium sulfosuccinate ("Aerosol OT"), this material is preferably employed in dilutions of less than 1%, preferably .001 to 0.1%, and where sodium chloride is added in addition to the Aerosol OT, the sodium chloride is used in concentrations from 0.5% to 5.0%. The use of these concentrations of Aerosol OT produce a resulting solution having a surface tension of 50 dynes or less per centimeter. Other wetting agents such as those mentioned above, are likewise used in such concentrations as will yield a water solution having a surface tension of 50 dynes or less per centimeter.

It has been found that when grain is treated prior to milling with an aqueous solution of wetting agent, in accordance with this invention, the moisture quickly becomes uniformly distributed in the grain and that the storage time between wetting and milling may be drastically reduced. A storage or tempering period of a few minutes is frequently sufficient. A storage period as low as 1 to 2 hours is adequate for many grains. A tempering period of 4 to 5 hours is sufficient for all but the most stubborn grains. For practical purposes a tempering period ranging from a few minutes to about 5 hours is utilized in almost all cases. Should it be expedient to hold the grain in the tempering bins for more than 5 hours, this will do no harm and this process accordingly will not endanger results should breakdowns or mill stoppages occur. It is, of course, desirable to utilize the shortest tempering period which will suffice. The tempering period may, therefore, be defined as a short period ranging from a few minutes to about 5 hours as the maximum, for all usual grains, and with the understanding that tempering period in excess of the 5 hour period produces no deleterious results. This is a tremendous advantage because it permits the miller to make adjustments in added moisture in accordance with changing weather conditions with assurance that when the grain is milled, the weather will not have changed sufficiently to disturb the moisture adjustment owing to the shorter time interval between the preparation of the wheat and its actual milling. In this connection it should be remembered that the change in atmospheric humidity over a two hour period is not usually very great, whereas the change may be considerable over a period of 8 to 48 hours.

The invention is illustrated by the following examples which however are merely illustrative and are not to be considered as limitations upon the invention:

*Example I*

1512 parts by weight of North Dakota spring wheat having a test weight of 59½ pounds per bushel, 11.7% moisture and 14.70% protein was wetted with 58 parts by weight of water containing .05% of the sodium salt of the dioctyl ester of sulfonated succinic acid (trade name "Aerosol OT"). The percentage moisture was thereby raised to 15%. The wheat was permitted to stand 3 hours at room temperature and was then ready for milling. The wheat milled satisfactorily yielding a flour having 14.0% moisture, 0.36% ash, 13.20% protein, and an elastic soft gluten of good quality.

The extraction of flour from wheat was 79% of which 82.9% was patent, 13.9% clear, and 3.2% low grade. The loss was 0.3%. The yield was 4.08 bushels to the barrel of flour.

The wheat milled readily and the middlings were "mellow," that is, neither too mushy nor too gritty.

The percentage yield of flour, the percentage of patent and the milling conditions were fully as good as with the best prior milling practices wherein the time of temper was never less than 8 hours, and frequently as much as 48 hours.

The resulting flour produced in this example with a short tempering time of 3 hours was fully equal the best previously produced from wheat of this quality, had satisfactory baking characteristics, and complete absence of any but the usual flour taste and odor.

*Example II*

1500 parts by weight of Montana spring wheat having a test weight of 58¾ lbs., 11.0% moisture and 14.30% protein was wetted with 70 parts by weight of a .1% of the sodium salt of the dioctyl ester of sulfonated succinic acid (trade name "Aerosol OT"). The percentage moisture was thereby adjusted to 15%. The wheat was permitted to stand 2 hours at room temperature and was then ready for milling. The wheat milled satisfactorily, the middlings being "mellow" as in Example I. The flour extraction was 76.1% of which 82% was patent, 15.1% clear, and 2.9% low grade. There was a total gain of .5% in milling indicating that moisture was picked up from the air during the milling operation. The flour was produced at the rate of 4.18 bushel per barrel.

The flour baked satisfactorily and was up to the standards prescribed for flour from such wheat. It had a 13.9% moisture, .44% ash, 14.60% protein and elastic gluten.

Here again the milling was begun within two hours of the time the wheat was originally wetted and good results were obtained in milling. The flour and bread made therefrom had taste and odor usual for good, high quality flour and bread.

*Example III*

This example relates to a continuous milling process utilizing 100% spring wheat of the Ceres and Marquis variety mostly from Montana having a moisture content of 11.4%. In this continuous process, the wheat is normally freed from foreign seeds, scoured and then washed. The wheat and a wash water of the type specified below were then fed at specified rates into a washer for removal of all but a certain required percentage of the moisture which is an amount sufficient to bring up the total moisture content to about 15.5-16.0%. The washed wheat is then taken to a bin for "tempering" where it remains until milling.

In prior practice, using ordinary water for washing, the minimum "tempering" time has been ten hours and the maximum forty-eight hours depending upon the type of wheat and amount of moisture added.

In this example the wash water contained .033% of a surface active agent, namely, the sodium salt of dioctyl ester of sulfonated succinic acid (trade name "Aerosol OT"). The proportioning of the wash water was as follows: A solution of 1.2 gallons of 5% solution of the surface active agent, namely, the sodium salt of the dioctyl ester of sulfonated succinic acid was added to each 180 gallons of wash water by means of a chemical proportioning pump thus giving a concentration of .033% of the surface active agent in the wash water. The wash water was fed at the rate of 180 gallons per hour and the wheat at the rate of 500 bushels per hour into the washer head. There was some removal of wash water to the sewer and along with it the dirt was removed and the wheat cleaned. The wheat milled satisfactorily after a 2½ hour "temper" as compared to the shortest prior tempering time of 10 hours. The flour produced was of a good grade, satisfactory and marketable in quality and baked well and was free from odors and tastes not usually present in flour of satisfactory grade. Throughout the milling, the middlings were noted to be "mellow," a condition desired by the miller since it facilitates milling.

*Example IV*

Another example of continuous milling similar to Example III was carried out but in this instance a mixture of 60% spring wheat and 40% winter wheat, having a moisture content of 11.4%, was used. In making up the wash water there was first prepared a concentrated solution containing 2.7% of the sodium salt of the dioctyl ester of sulfonated succinic acid (trade name "Aerosol OT") and 1% sodium chloride. The concentrated solution was fed into the wash water at the rate of 1.2 gallons for each 180 gallons of wash water, the proportioning being done continuously by a chemical proportioning pump. The wash water thus prepared was fed at the rate of 180 gallons per hour and the wheat at the rate of 500 bushels per hour into a washer as in Example III for the removal of all but the necessary amount of water to raise the total moisture content to 15.5-16.0%. The thus treated wheat then passed to the tempering bins where it was allowed to stand three hours before milling.

The wheat milled satisfactorily after three hours as compared with the shortest prior temper of ten hours. The flour produced was of a good grade, satisfactory and marketable in quality and baked well, and had the odors and tastes of first class, marketable flour. Throughout the milling, the "middlings" were noted to be "mellow."

*Example V*

In another instance, a dry wheat containing 10% moisture was treated in a manner similar to that of Examples III and IV, except that the wash water was continuously proportioned and fed as follows: To each 180 gallons of water (used per hour with 500 bushels of wheat) there was added 1.2 gallons of a concentrate containing 2.2% of the sodium salt of the dioctyl ester of sulfonated succinic acid (trade name "Aerosol OT"). The wheat was washed and the excess removed as in Example III, but was permitted to leave the drum with insufficient moisture, namely, about 14-15%. Leaving the washer, the wheat stream was passed through a screw conveyor and during the passage there was added about one pound per minute of the clean wash water solution containing the sodium salt of the dioctyl ester of sulfonated succinic acid. This remained in the wheat which then went to tempering bins where it was allowed to stand 2½ hours before milling.

The milling was entirely satisfactory. The middlings were "mellow," that is to say, neither too soft nor too hard, and were easily handled in the mill.

Since a short tempering time was satisfactory, it was feasible to increase the rate of addition of water added in the wetting treatment to compensate for a lowering in humidity which occurred while the continuous process was going on.

The manner of application may be either as a batch process or continuously as a factor in an already used washing procedure, or by spraying or dripping of the solution into the wheat into a conveyor.

It is to be understood that the moisture penetration by the short tempering operations of the present invention is accomplished without any physical change in the wheat or grain undergoing milling, the wheat berries being in all respects the same as normal, clean, whole wheat. The wheat is then milled in accordance with standard multiple-break roller mill practice, as heretofore.

The effectiveness of the use of such methods is such that tempering time may be decreased to a period in the range of a few minutes to five hours as contrasted with eight to forty-eight hours with prior practices; milling conditions are bettered, and the elasticity of the dough made from the resultant flour is improved.

This application is a continuation-in-part of my application Serial No. 456,705 filed August 29, 1942, which is in turn a continuation-in-part of my application Ser. No. 377,514 filed February 5, 1941.

Many obvious variations will occur to those skilled in the art and are considered to be within the scope of the invention described and claimed as follows.

What I claim is:

1. An improvement in the rapid moisture conditioning of grain for milling which comprises introducing moisture into the grain by wetting the grain with water containing from .001% to 1% of the dioctyl ester of sodium sulfosuccinate, the amount of water so added being sufficient to increase the moisture content only to an amount suitable for roller milling, and, when the moisture has entered the outer coating, milling the grain to remove the said outer coating and disintegrate the grain.

2. An improvement in the rapid moisture conditioning of grain for milling which comprises introducing into the grain a net amount of water solution sufficient to raise the moisture content thereof to a predetermined percentage suitable for roller milling; said water solution containing from .001% to 1% of the dioctyl ester of sodium sulfosuccinate, and thereafter, when the water has entered the outer coating of the grain, roller milling it to remove the outer coating thereof and disintegrate the grain.

3. The process of claim 2 wherein after the water solution is added the grain is stored for a short but sufficient period, namely from about one hour to about five hours.

4. An improved continuous method of rapidly moisture conditioning grain for milling comprising adding to a continuous stream of wheat a water solution containing from .001% to 1% of the dioctyl ester of sodium sulfosuccinate, said added water solution being continuously proportioned so as to raise the moisture level of the wheat to a predetermined level suitable for roller milling, and thereafter allowing the grain to stand for a time period of from about one hour to about five hours, and then roller milling the grain to remove the outer coating thereof and disintegrate it.

5. The process of claim 4 wherein the water solution added to the wheat is the usual wash water to which there is added less than 1% of the dioctyl ester of sodium sulfosuccinate.

6. An improved process of moisture conditioning grain for milling comprising wetting the grain with water containing from .001% to 1% of the sodium salt of dioctyl ester of sulfonated succinic acid, the net amount of the water so added being sufficient to increase the average moisture content of the grain to an amount suitable for milling, then tempering the grain for a period sufficient to allow the moisture to equalize in the grain, namely from about one hour to about 5 hours whereupon the grain is in a suitable condition for milling, and then roller milling the grain to remove the outer coating thereof and disintegrate it.

7. An improved process of moisture conditioning grain for roller milling comprising wetting the grain with water containing .001% to 1% of the sodium salt of the dioctyl ester of sulfonated succinic acid, the net amount of water so added being sufficient to increase the average moisture content of the grain to about 15% to 16%, then allowing the grain to stand for at least one to five hours, and then roller milling the grain to remove the outer coating thereof and disintegrate it.

8. An improved process of moisture conditioning grain for roller milling which comprises adding to the grain a water solution containing .001% to 0.1% of the sodium salt of the dioctyl ester of sulfonated succinic acid, the net amount of water solution so added being sufficient to increase the average moisture content of the grain to the range of about 15% to 16%, thereafter allowing the grain to stand in tempering bins for a time period sufficient to allow the water to penetrate and toughen the outer coating of the grain, but not substantially exceeding five hours, and then roller milling the grain to remove said outer coating and disintegrate the grain.

9. An improved process of moisture conditioning grain for roller milling which comprises adding to the grain a water solution containing .001% to 0.1% of the sodium salt of the dioctyl ester of sulfonated succinic acid, the net amount of water solution so added being sufficient to increase the average moisture content of the grain to the range of about 15% to 16%, thereafter allowing the grain to stand at room temperature for a period sufficient to allow the water solution to penetrate and toughen the outer coating of the grain, but not substantially exceeding five hours, and then roller milling the grain to remove said outer coating and disintegrate the grain.

10. The process of treating dry grain for debranning and grinding which consists in adding to the grain a measured quantity of water sufficient only to cause moisture penetration of the outer coverings and bran coats so as to toughen them for debranning purposes and sufficient moisture to penetrate the endosperm to prepare it for disintegration milling, characterized by the addition of a sufficient amount of an edible surface tension depressant to reduce the surface tension of the water to less than 50 dynes per centimeter, debranning the treated grain while in its thus moistened condition and immediately thereafter subjecting the debranned grain to milling operation to thoroughly disintegrate the same, said debranning step being performed approximately one hour after the initial addition of the water containing the surface tension depressant to allow time for penetration.

11. The process as set forth in the preceding claim for preparing grain for milling wherein the surface tension depressant employed is the dioctyl ester of sodium sulfosuccinate.

12. The process of treating grain of natural moisture content for roller milling which comprises adding to the grain a measured quantity of water sufficient only to cause moisture penetration of the outer coverings so as to toughen them for debranning purposes, to penetrate the endosperm to prepare it for roller milling and to adjust the moisture content so as to yield a final milled product of the desired moisture content, characterized by the addition to the water of a sufficient amount of an edible surface tension depressant to reduce the surface tension of the water to less than 50 dynes per centimeter, roller milling the treated grain while in its thus moistened condition to debran the grain, and immediately thereafter thoroughly disintegrate the same, said roller milling being initiated less than five hours after the initial addition of the water containing the surface tension depressant to allow time for said moisture penetration.

13. The process as set forth in the preceding claim for treating grain of natural moisture content for roller milling, wherein the surface tension depressant employed is the dioctyl ester of sodium sulfosuccinate.

ELIZABETH J. SULLIVAN.

Certificate of Correction

Patent No. 2,413,472. December 31, 1946.

ELIZABETH J. SULLIVAN

It is hereby certified that error appears in the printed specification of the above numbered patent requiring correction as follows: Column 8, line 6, claim 8, after "water" insert *solution*; and that the said Letters Patent should be read with this correction therein that the same may conform to the record of the case in the Patent Office.

Signed and sealed this 15th day of April, A. D. 1947.

[SEAL]

LESLIE FRAZER,
*First Assistant Commissioner of Patents.*